US006685475B1

United States Patent
Maruyama et al.

(10) Patent No.: US 6,685,475 B1
(45) Date of Patent: Feb. 3, 2004

(54) LEARNING CONTROL INFORMATION GENERATION METHOD, APPARATUS AND COMPUTER READABLE MEDIUM STORING LEARNING CONTROL INFORMATION GENERATION PROGRAM

(75) Inventors: Mina Maruyama, Nerima-ku (JP); Kiyoshi Nakabayashi, Nerima-ku (JP)

(73) Assignee: Nippon Telegraph & Telephone Corporation, Tokyo (JP)

( * ) Notice: Subject to any disclaimer, the term of this patent is extended or adjusted under 35 U.S.C. 154(b) by 0 days.

(21) Appl. No.: 09/457,552

(22) Filed: Dec. 9, 1999

(30) Foreign Application Priority Data

Dec. 10, 1998 (JP) ............................................. 10-351770

(51) Int. Cl.[7] ................................................ G09J 19/00
(52) U.S. Cl. ........................ 434/118; 434/350; 434/362; 705/1
(58) Field of Search ................................ 709/203, 219; 705/1; 434/118

(56) References Cited

U.S. PATENT DOCUMENTS

| 5,920,859 | A | * | 7/1999 | Li ................................. 707/10 |
| 6,003,076 | A | * | 12/1999 | Maruyama et al. ......... 709/223 |
| 6,122,647 | A | * | 9/2000 | Horowitz et al. ............. 99/349 |
| 6,190,178 | B1 | * | 2/2001 | Oh ............................... 434/322 |

FOREIGN PATENT DOCUMENTS

| JP | 05232857 A | * 10/1993 | ............ G09B/7/00 |
| JP | 9-1539126 | 6/1997 | |
| JP | 09 265477 | 10/1997 | |
| JP | 10-320334 | 12/1998 | |

OTHER PUBLICATIONS

P. Brusilovsky et al., "Web–based Education for ALL: A Tool for Development Adaptive Courseware", Computer Networks and ISDN Systems (Proceedings of the Seventh International World Wide Web Conference, Apr. 14–18, 1998) 30 (1–7), 291–300.*
K. Nakabayashi et al., "Architecture of an Intelligent Tutoring System on the WWW", Proceedings of the 8th World Conference of the AIED Society, Kobe, Japan, Aug. 18–22, 1997.*
G. Weber et al., "User Modeling and Adaptive Navigation Support in WWW–based Tutoring Systems", Proceedings from UM–97, Cagliari, Italy, Jun. 2–5, 1997.*
K. Nakabayashi et al., "An Intelligent Tutoring System on the WWW Supporting Interactive Simulation Environment with a Multimedia Viewer Control Mechanism", Proceedings from WebNet 96, San Francisco, CA, Oct. 15–19, 1996.*

(List continued on next page.)

*Primary Examiner*—John G. Weiss
*Assistant Examiner*—Jonathan Ouellette
(74) *Attorney, Agent, or Firm*—Kenyon & Kenyon

(57) ABSTRACT

A learning control information generation method in a web-based training system which uses the WWW for education is provided. The learning control information generation method includes the steps of specifying hypertext information which is processed first, requesting and obtaining the hypertext information, analyzing the hypertext information, and obtaining element information and link information, storing relations between the hypertext information, the element information and the link information by using list structure in a storage, detecting a relation which corresponds with a condition of a rule for generating learning control information necessary for the web-based training system from the stored relations, and executing an action of the rule and outputting the learning control information.

20 Claims, 23 Drawing Sheets

OTHER PUBLICATIONS

M. Maruyama et al., "An Approach to Implementing Adaptive Hyermedia for an Intelligent Tutoring System on the World–Wide Web", Proceedings of Ed–Telecom 96, World Conference on Educational Telecommunications, p. 373 Jun. 17, 1996.*

J. Eklund, "Knowledge–Based Navigation Support in Hypermedia Courseware using WEST", Australian Educational Computing, vol. 11, No. 2, pp. 10–14, Nov., 1996.*

D. Pilar da Silva et al., "Concepts and Documents for Adaptive Educational Hypermedia: A Model and A Prototype", Proceedings of the $2^{nd}$ Workshop on Adaptive Hypertext and Hypermedia HYPERTEXT'98, Pittsburgh, USA, Jun. 20–24, 1998.*

"Design and Development of Melbourne IT Creator™—a System for Authoring and Management of Online Education", Steve B. Goschnick, Department of Computer Science, The University of Melbourne, Jul. 1998.

* cited by examiner

FIG. 3 PRIOR ART

Let's study how to use E-mail.

First, let's study how to read a received E-mail.

FIG. 8 PRIOR ART

| PAGE | ORIGINAL LINK | ANCHOR | COMMAND |
|---|---|---|---|
| http://w/1.htm | http://w/2.htm | NEXT | NEXT |

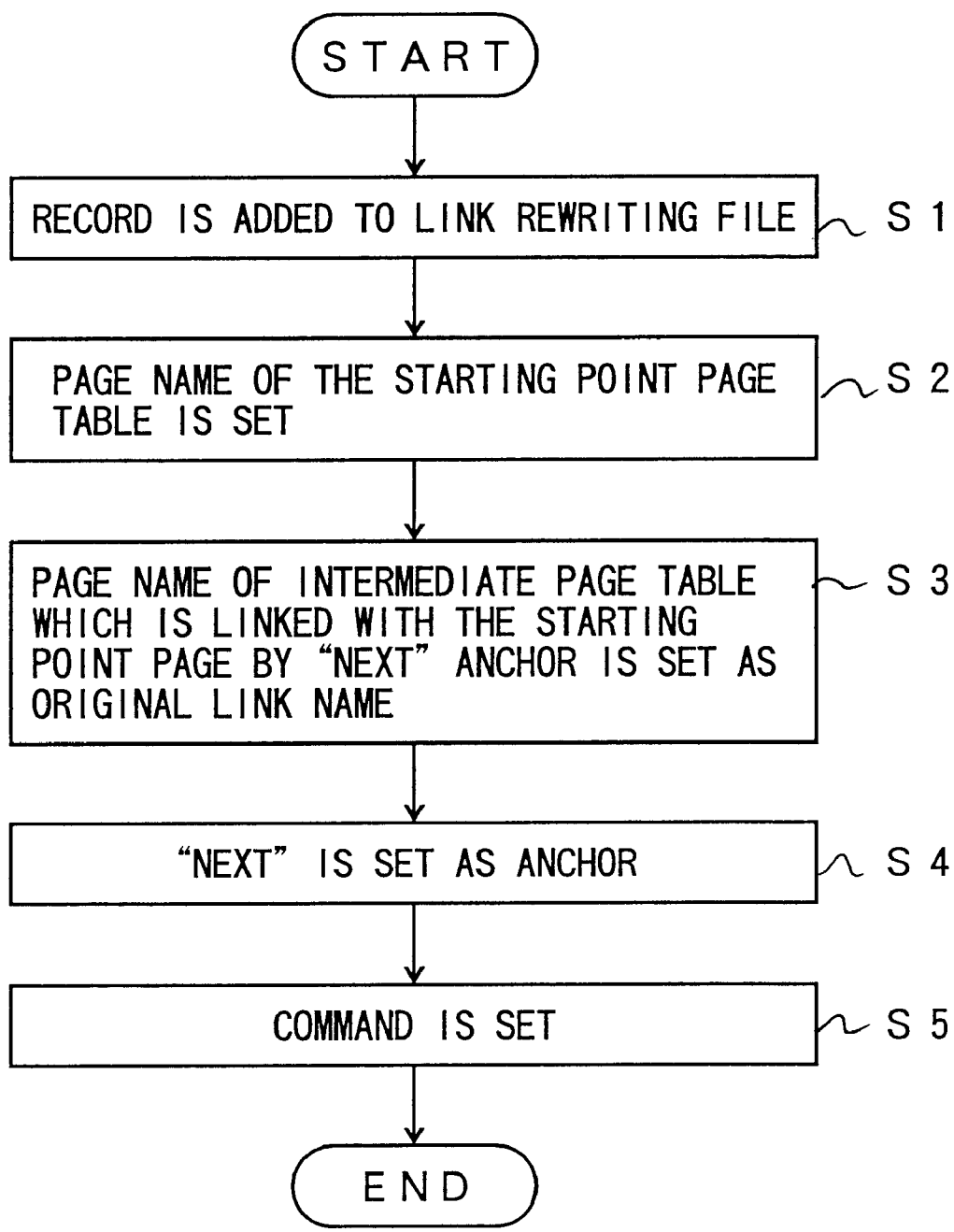

FIG. 19

```
RULE 3 :
    CONDITION
        WHEN THERE IS PAGE TABLE WHICH IS LINKED FROM ANCHOR TABLE
        HAVING RECORD WITH ANCHOR NAME "DICTIONARY", "REFERENCE" OR
        "LIBRARY"
    ACTION
        EVERY ANCHOR NAME IN THE ANCHOR TABLE IS ADDED TO TARGET
        DEFINITION TABLE

RULE 4 :
    CONDITION
        RECORD IN THE ANCHOR TABLE IS LINKED BY ANY OTHER ANCHOR
        TABLE
    ACTION
        LINK SCENARIO TABLE AND TARGET BY POINTER
```

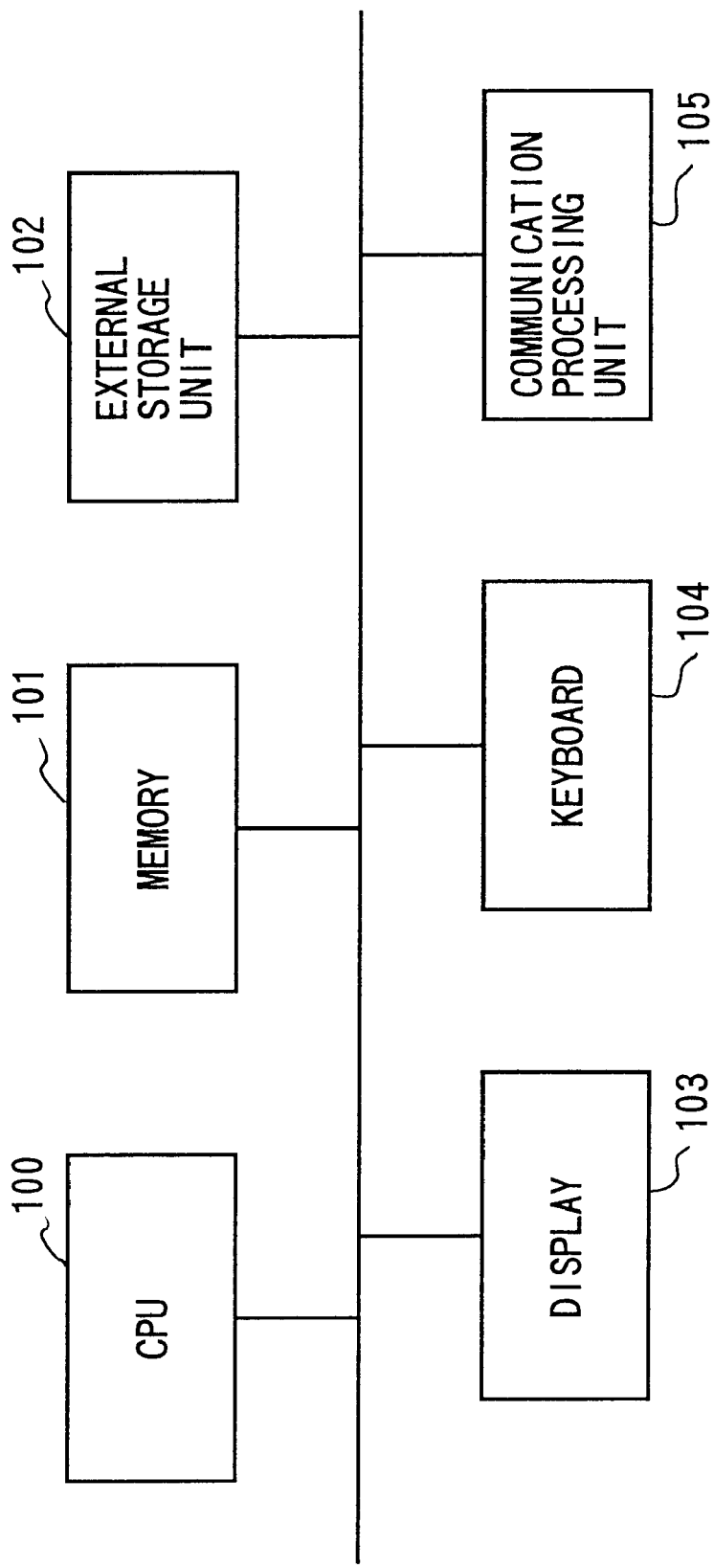

LEARNING CONTROL INFORMATION GENERATION METHOD, APPARATUS AND COMPUTER READABLE MEDIUM STORING LEARNING CONTROL INFORMATION GENERATION PROGRAM

BACKGROUND OF THE INVENTION

1. Field of the Invention

The present invention generally relates to a learning control information generation method, an apparatus and a computer-readable medium storing a learning control information generation program. More particularly, the present invention relates to a learning control information generation method, an apparatus and a computer-readable medium storing a learning control information generation program in an information providing system which includes an information providing server, an information terminal which requests, receives and displays information, and a communication means such as a computer network which connects them. In the information providing system, the information terminal sends a request for information selected by a user to the information providing server. The information providing server selects information based on control information which is provided beforehand. The information providing system may be, for example, an information providing system using the Internet, such as the WWW (World-Wide Web) system.

2. Description of the Related Art

In the following, a hypertext system will be described as a first conventional technique.

The hypertext system includes an information server which stores information and an information terminal which obtains and displays the information according to a user's operation, the information server and the information terminal being connected via the Internet.

FIG. 1 is a block diagram showing the hypertext system. The technique is described, for example, in T. Berners-Lee et al., "The World-Wide Web", Communications of the ACM, vol. 37(8), pp. 76–82. The system shown in FIG. 1 includes an information providing server 10, an information terminal 40 and a computer network 30. The information terminal 40 and the information providing server 10 may be two or more respectively.

The information providing server 10 includes an information file 20 which stores providing information, a receiving part 11 which receives a request, a retrieving part 12 which retrieves a page from the information file 20 based on the request and a sending part 13 which sends the retrieved page to the information terminal 40. The page is a unit of information provided to the information terminal 40 from the information providing server 10.

FIG. 2 shows an example of a construction of information provided by the information providing server 10. FIG. 3 shows an example of the information provided by the server which is displayed on the information terminal 40. The page describes not only text information which is visualized by the information terminal 40 but also information which is not visualized and is associated with a part of the text information. The information is called markup information. In the following, the markup information will be described taking the WWW as an example.

The markup information is distinguished from the visualized text information by bracketing with descriptors "<" and ">" as shown in FIG. 2. The markup information is placed before and after a part of text information (which will be called element information) which is associated with other information. A part before the element is called a start tag, and a part after the element is called an end tag. The start tag describes one tag identifier, zero or more numbers of attribute names and/or an attribute name and a value of the attribute name in a format shown below.

<tag identifier attribute attribute=value>

The end tag is formatted as follows.

</tag identifier>

There are various kinds of tag identifiers. A representative example is an anchor tag which is shown in FIG. 2. The anchor tag indicates that there exists another page which is associated with an element (which is called an anchor) corresponding to the anchor tag. The identifier is "a" or "A". As shown is FIG. 3, an under score is displayed at the element part on a screen of the information terminal such that a user is notified of existence of the associated information. As an attribute of the anchor tag, there is an "href" attribute which indicates a location of the associated information. A format called "URL" shown below is widely used as a format of the value of the "href" attribute.

href=communication protocol name://server name/page identifier

The communication protocol shown above indicates a processing method in which an information providing server and an information terminal transmit/receive information. In FIG. 2, HTTP which is widely used in the WWW is specified. The attribute value which is specified by the href attribute is also called link information. Generally, the link information can be defined as URI (Uniform Resource Identifier) information which is included in the markup information.

When a user selects desired information, for example, by clicking on an anchor part of a page displayed on the screen shown in FIG. 3 with a mouse, for example, the information terminal requests and obtains information based on link information corresponding to the anchor part, and displays the information on the screen.

By repeating the above-mentioned process, the user obtains necessary information one after another.

An execution result of a program executed in a server can be obtained by specifying a program name executed in the server and an argument in an href format shown below:

href=communication protocol name://server name/program name & argument=value.

Next, a personal adapting type hypertext system, which is a second conventional method, will be described. The above-mentioned first conventional method can not be used for education since appropriate information corresponding to user's circumstances can not be provided. The personal adapting type hypertext system changes providing information contents so that the information contents are adapted to the user's personal information. The personal adapting type hypertext system is disclosed in Japanese patent application No. 7-313053, "Information providing method and information providing system", and Japanese patent application No. 9-124309, "Information providing method, apparatus and a computer-readable medium storing information providing program". The personal adapting type hypertext system can be called a web-based training system.

A configuration of the personal adapting type hypertext system will be described with reference to FIG. 4. The personal adapting type hypertext system includes an information terminal 40, an information providing server 10 and a computer network 30, which are also included in the normal hypertext system, and a learning support server 50.

The learning support server 50 includes a receiving part 51, a requesting part 52, a personal information file retrieving part 55, an adapting part 53, and a sending part 54. A personal history file 60, a scenario definition file 70, a target definition file 80 and a link rewriting definition file 90 are connected to the personal information file retrieving part 55.

The scenario definition file 70 will be described in the following. The scenario is a description used for determining a display order of information when a user learns something. The scenario will be described by taking a three-layer hierarchical structure as an example with reference to FIG. 5 since generally learning information contents have a hierarchical structure including a chapter, a section, a paragraph and the like. Information having the chapter structure has three items which are a chapter number, a title and information (which is called a pointer) indicating a location of a table describing information of the section which belongs to the chapter. Likewise, the section includes three items of a section number, a title and a pointer to a paragraph belonging to the section. The paragraph information includes a paragraph number, a title, a page name and a pointer to a target definition table which corresponds to the paragraph contents. A table in which a scenario is described is called a scenario table.

Next, the target definition file 80 will be described. A learning target is a concept which a user is to learn, which concept is represented by a hierarchical structure. In the following, the target definition file 80 will be described with reference to FIG. 6. A learning target includes a target name and sub-targets into which the target is divided. The target definition file 80 includes the target name and pointers to the sub-targets which belong to the target. The sub-target includes a sub-target name and a pointer to a paragraph of a scenario for learning the sub-target or to a question for testing whether the user has learned the sub-target.

For the above-mentioned two definition files, all files do not necessarily have the same number of layers for chapters. That is, for example, a chapter may have two layers or four layers. In addition, the pointer which is defined in the scenario and the target have a list structure shown in FIG. 7 so that a plurality of pointers which point to each other can be represented.

Next, the link rewriting definition file 90 will be described with reference to FIG. 8. The link rewriting definition file 90 has control information for rewriting a link name when the link name which is specified as an original link name exists in a page specified by a page name. More specifically, when a link which has an anchor name of "next screen" exists, generally the link points to a specific page. If the link is converted in advance to a "NEXT" command which requests a next screen appropriate for the progress of learning of the user, the user can receive an appropriate page. In addition, the learning support server supports various learning support commands such as an "INDEX" command which enables the terminal to display the table of learning contents including the user's progress, and a "DIC" command which provides a dictionary function in accordance with the user's progress. Each command can be applied to anchors such as "table of contents" and "search" which may be commonly seen on a hypertext of the WWW.

The learning support server 50 stores pages which the user has finished reading and learning targets which the user has understood at some point in time in the personal history file 60. When the user requests a next page, the learning support server provides appropriate information based on the scenario definition file 70 and the target definition file 80.

For example, assuming that the user is executing "problem 1 of section 2 (how to capture mail) in chapter 2 (how to read an E-mail)", when the user solves the practice problem and sends the result to the learning support server 50, the learning support server marks the result and determines whether the user passes the section. When the user passes the section, the learning process goes to a chapter three "how to write an E-mail". When the user does not pass, the server supports the user, for example, by presenting a page on which the same target as the target corresponding to the problem which the user could not solve is set. For example, when the user could not solve the problem 1, since it means that the user does not fully understand the sub-targets "how to open" and "how to close", the server goes back the user's learning process to paragraph 1 and paragraph 2 on which those sub-targets are set.

The process by the learning support server will be described with reference to FIG. 9. First, the user sends a command (for example, "NEXT") to the learning support server. The server checks the scenario definition file and the target definition file against the user's learning history thus far, and determines a screen which will be displayed next. Then, the learning support server obtains the determined screen from the information providing server in place of the user's terminal. The learning support server analyzes the obtained file, and rewrites link information into a command for the learning support server, when there is an applicable item in a command conversion file, and sends the command to the user.

According to the above-mentioned process, the user can receive information appropriate for the user's learning progress while the user reads the same visualized information as normal hypertext information and the information terminal sends various commands to the learning support server.

According to the above-mentioned second conventional method, a sophisticated information providing service adaptable to each user can be realized. However, for realizing the second conventional method, it is necessary to prepare control information which includes the scenario definition file, the target definition file and the link rewriting definition file, which is a problem since the preparation cost is high.

In addition, there are cases where information maintained by the information providing server may be modified by an administrator of the information providing server with no advance notice. As a result, the control information can not maintain consistency with the information in the information providing server, and thereby the learning support server can not operate appropriately.

SUMMARY OF THE INVENTION

It is an object of the present invention to provide a learning control information generation method, an apparatus and a computer readable medium storing a learning control information generation program which automatically generate learning control information from existing hypertext pages.

The above object of the present invention is achieved by a learning control information generation method in a web-based training system which uses the WWW for education, the learning control information generation method comprising the steps of:

specifying hypertext information which is processed first;
requesting and obtaining the hypertext information;
analyzing the hypertext information, and obtaining element information and link information;
storing relations between the hypertext information, the element information and the link information in a storage by using a list structure;

detecting a relation which corresponds with a condition of a rule for generating learning control information necessary for the web-based training system from the relation between the hypertext information, the element information and the link information; and executing an action of the rule and outputting the learning control information.

According to the above-mentioned invention, a hyperlink structure of a page specified by a user is analyzed. Then, a scenario and a target which is linked with the scenario are determined based on link information and anchor information included in the page by executing a predetermined rule. The scenario and the target can be used as a scenario definition file and a target definition file.

The above-mentioned method may further comprise the steps of:

asking a user whether the rule needs to be executed after the relation is detected; and executing the action of the rule only when the user accepts.

According to the above-mentioned invention, a user's judgment can be applied so that learning control information can be generated more appropriately.

The above-mentioned method may further comprise the steps of:

asking a user to select what process needs to be applied to a hyperlink structure to which the rule can not be applied; and executing the process which the user selects.

Accordingly, even when a hyperlink structure corresponds with the rule condition, desired learning control information can be generated.

The above object of the present invention is also achieved by a learning control information generation method in a web-based training system which uses the WWW for education, the learning control information generation method comprising the steps of:

obtaining a file corresponding to a first page when a user specifies the first page to the web-based training system;

analyzing contents of the first page, obtaining a page linked from a page in the file one after another and analyzing every hyperlink structure;

storing a result of the analyzing step in a storage by using a list structure, the storage being for storing a hyperlink structure comprising a page table having information including a file name of each page, an anchor included in each page and an anchor table having a pointer to a page table corresponding to a linked page; and applying at least a rule to the information stored in the storage, the rule being for generating a scenario table, a link rewriting table and a target definition table which are learning control information necessary for the web-based training system, and generating the learning control information.

According to the above-mentioned invention, a hyperlink structure of a page specified by a user is analyzed. Then, a scenario and a target which is linked with the scenario are determined based on link information and anchor information included in the page by executing a predetermined rule. The scenario and the target can be used as a scenario definition file and a target definition file.

In the above-mentioned learning control information generation method, the rule may comprise:

a condition for determining whether the rule is applied; and an action which is executed when the condition is satisfied.

In the above-mentioned learning control information generation method, the action may comprise the steps of:

setting a title in a first scenario table;

generating a second scenario table;

setting a starting point page table and at least an intermediate page table in the second scenario table; and setting a pointer to the second scenario table in the first scenario table.

According to the above-mentioned invention, a scenario table can be generated effectively from contents having a structure corresponding to "chapter" or "section".

In the above-mentioned learning control information generation method, the condition may be satisfied when at least two page tables of a plurality of page tables which are connected by a conjunction which represents a continuation have the same parent anchor table.

In addition, in the above-mentioned learning control information generation method, the condition is satisfied when at least two page tables of a plurality of page tables which are connected by a conjunction which represents a continuation have the same parent anchor table; and the action comprises the steps of:
  adding a record in a link rewriting file;
  setting a page name of a starting point page table;
  setting a page name of an intermediate page table as an original link name;
  setting the conjunction as an anchor; and
  setting a command corresponding to the conjunction.

According to the above-mentioned invention, a link rewriting file can be generated efficiently.

In the above-mentioned learning control information generation method, according to the rule, the learning control information generation method may further comprise the steps of:

setting, when a dictionary page exists, all terms of the dictionary page in a target definition table; and linking, when a page having a link to a term of the dictionary page exists in a scenario table, a record corresponding to the page in the scenario table and a record corresponding to the term in the target definition table.

According to the above-mentioned invention, a target definition table can be generated efficiently.

In addition, in order to achieve the above-mentioned object, a learning control information generation apparatus and computer readable medium storing a learning control information generation program which are applicable to carrying out the above-mentioned learning control information generation method are provided.

BRIEF DESCRIPTION OF THE DRAWINGS

Other objects, features and advantages of the present invention will become more apparent from the following detailed description when read in conjunction with the accompanying drawings, in which:

FIG. 3 shows an example of the information provided by the information server displayed on an information terminal;

FIG. 8 shows an example of a link rewriting definition file;

FIGS. 15A–C are diagrams for explaining rules according to the first embodiment of the present invention;

FIG. 19 shows rules according to the second embodiment of the present invention;

FIG. 21 is a block diagram showing a hardware configuration of a computer system.

DETAILED DESCRIPTION OF THE PREFERRED EMBODIMENTS

Figure 1:
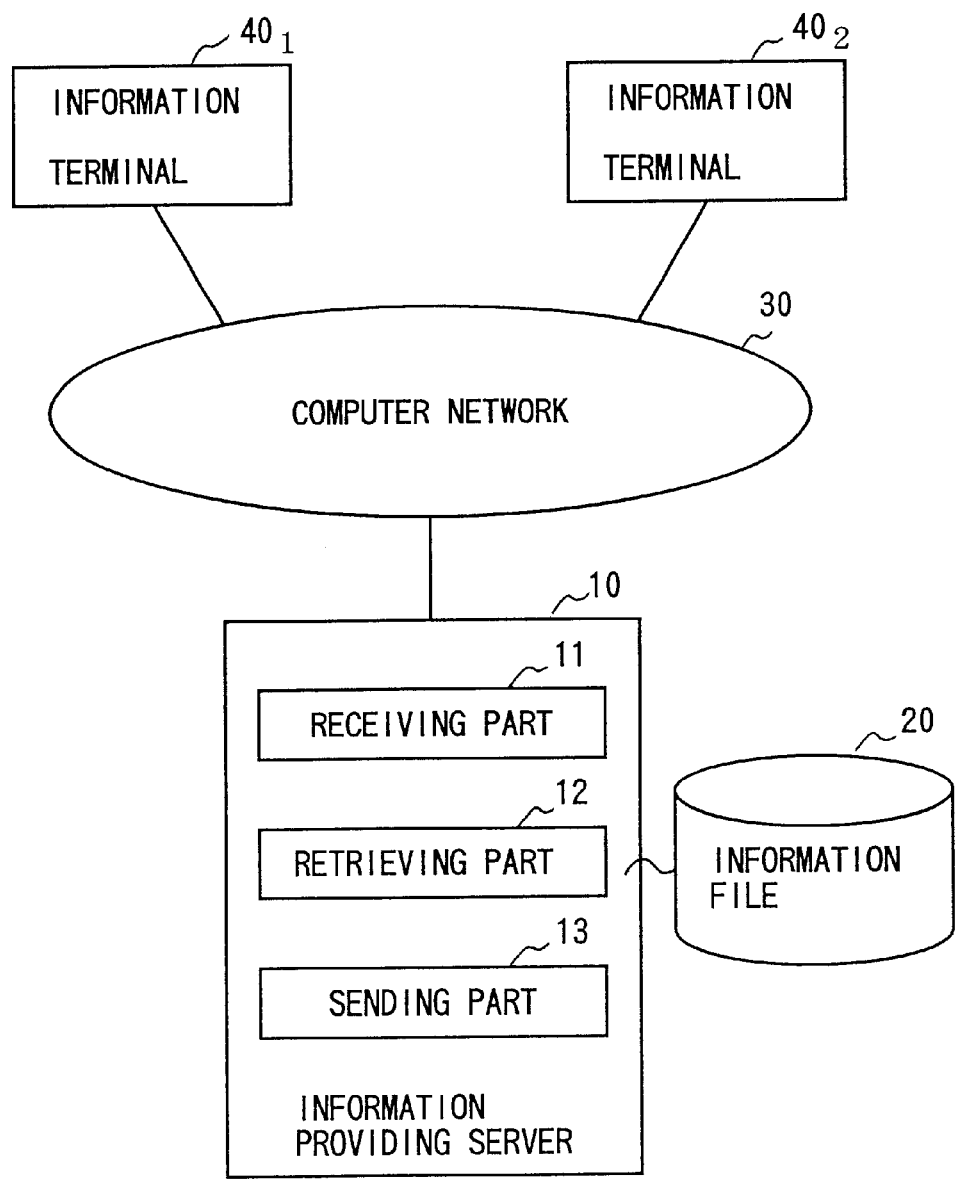
FIG. 1 is a block diagram showing a hypertext system.
Figure 2:
FIG. 2 shows an example of a construction of information provided by an information server.
Figure 4:
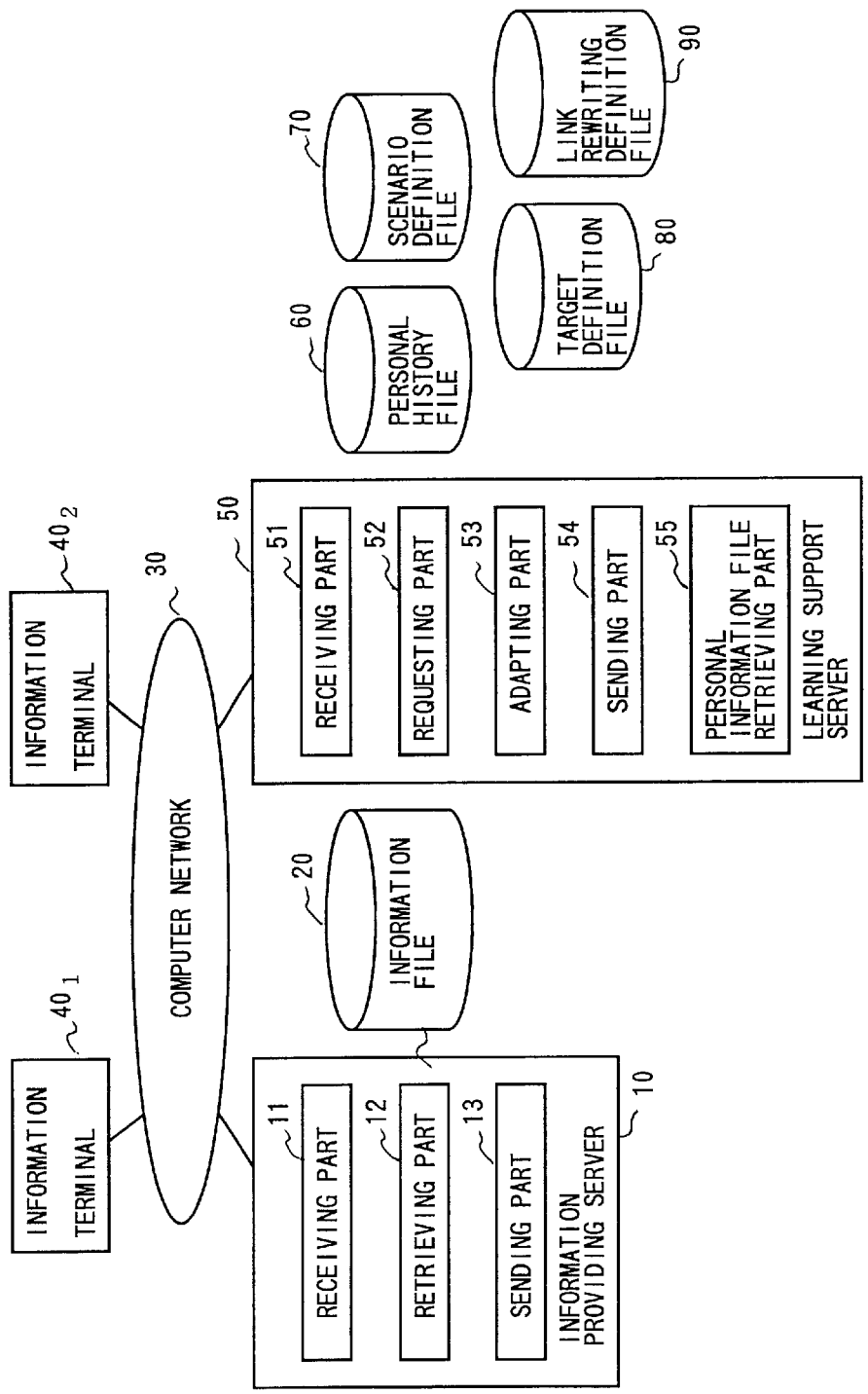
FIG. 4 is a block diagram of a hypertext system of a personal adapting type.
Figure 5:
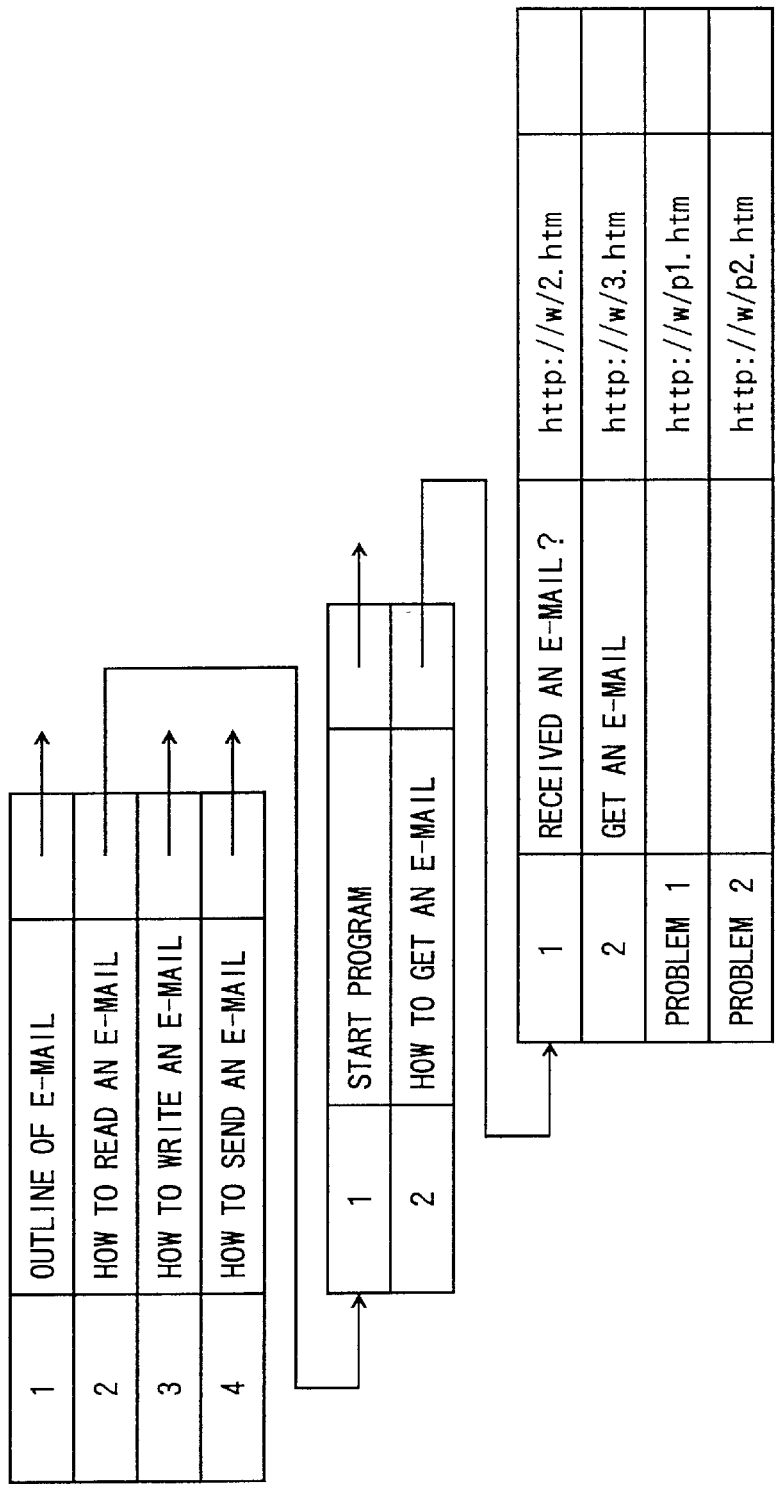
FIG. 5 is an example of a scenario which is a hierarchical structure.
Figure 6:
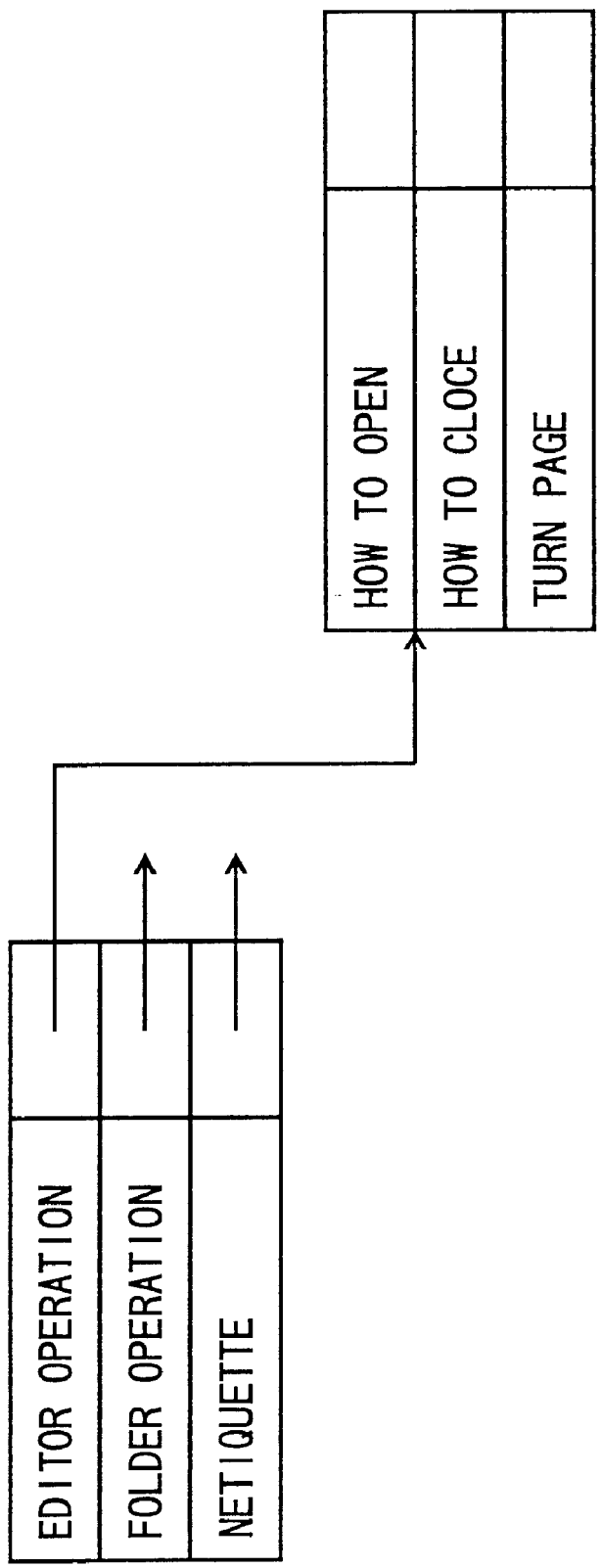
FIG. 6 is a conceptual diagram of a target definition file.
Figure 7:
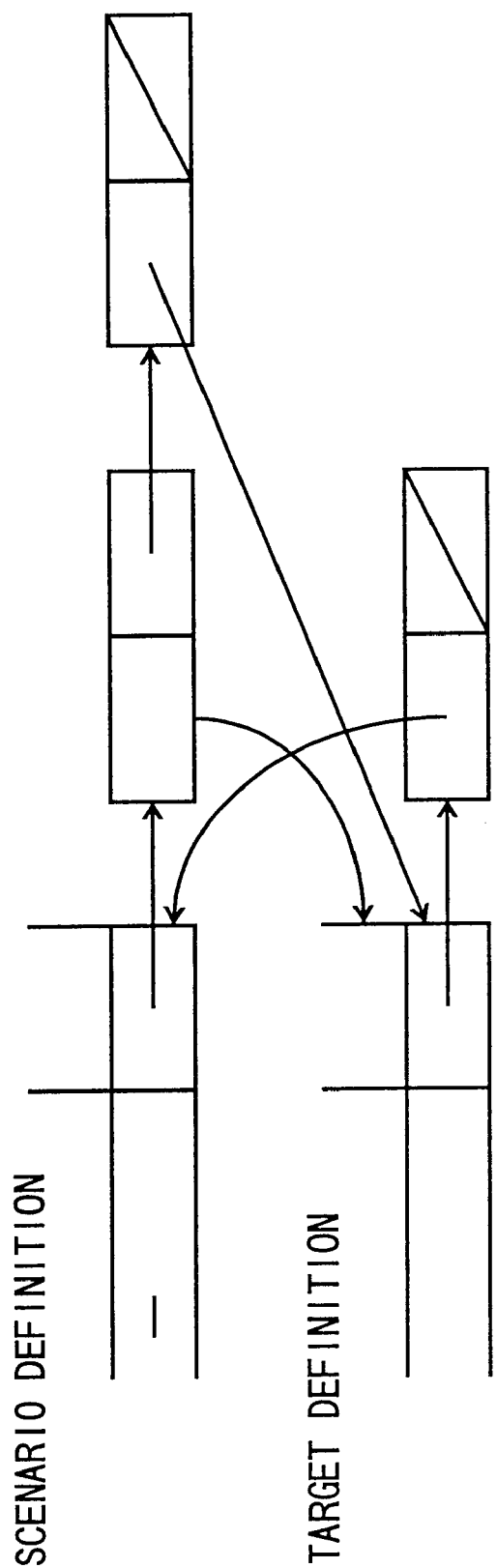
FIG. 7 shows an example of list structure.
Figure 9:
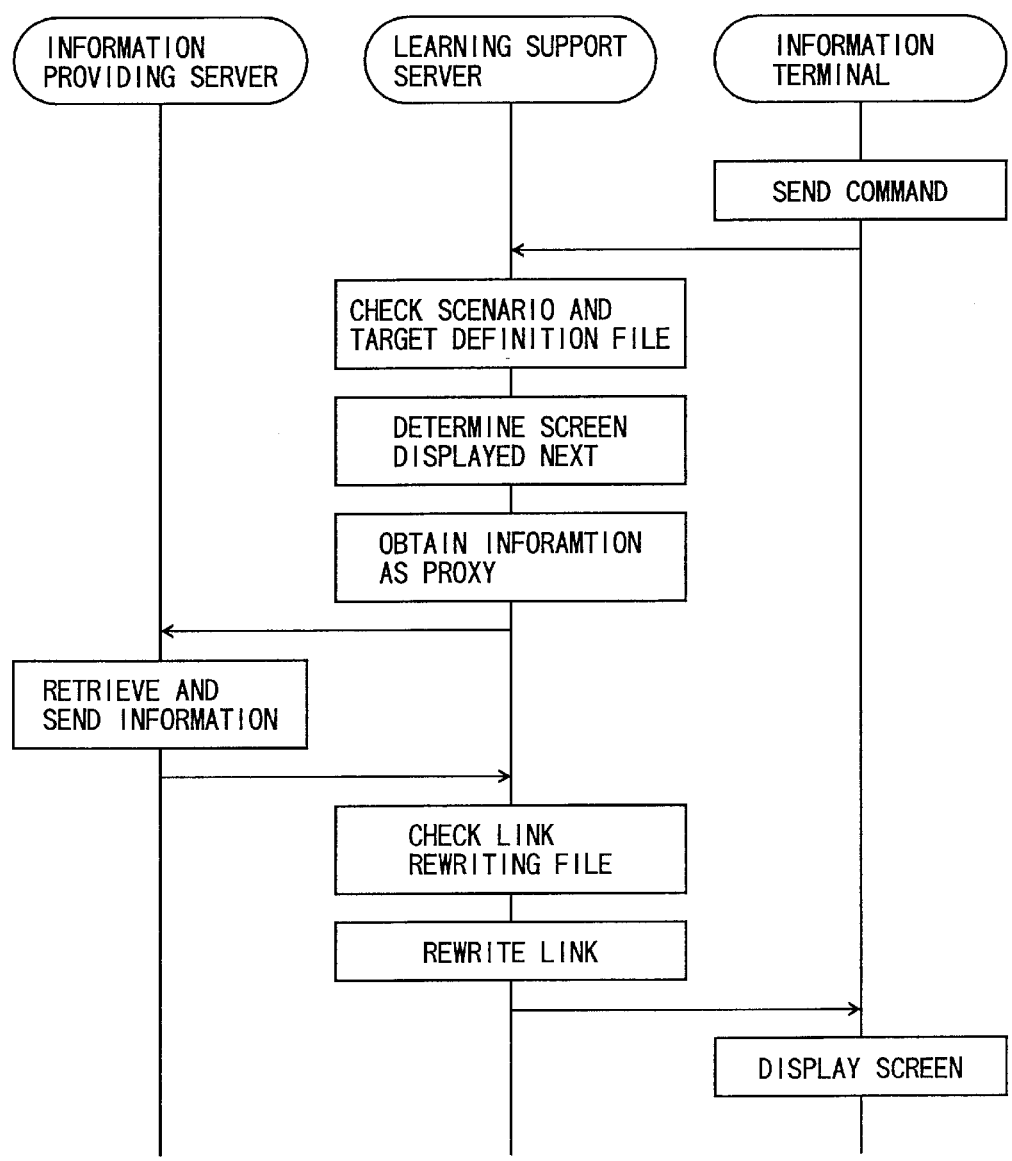
FIG. 9 is a sequence chart showing an operation of a learning support server.
Figure 10:
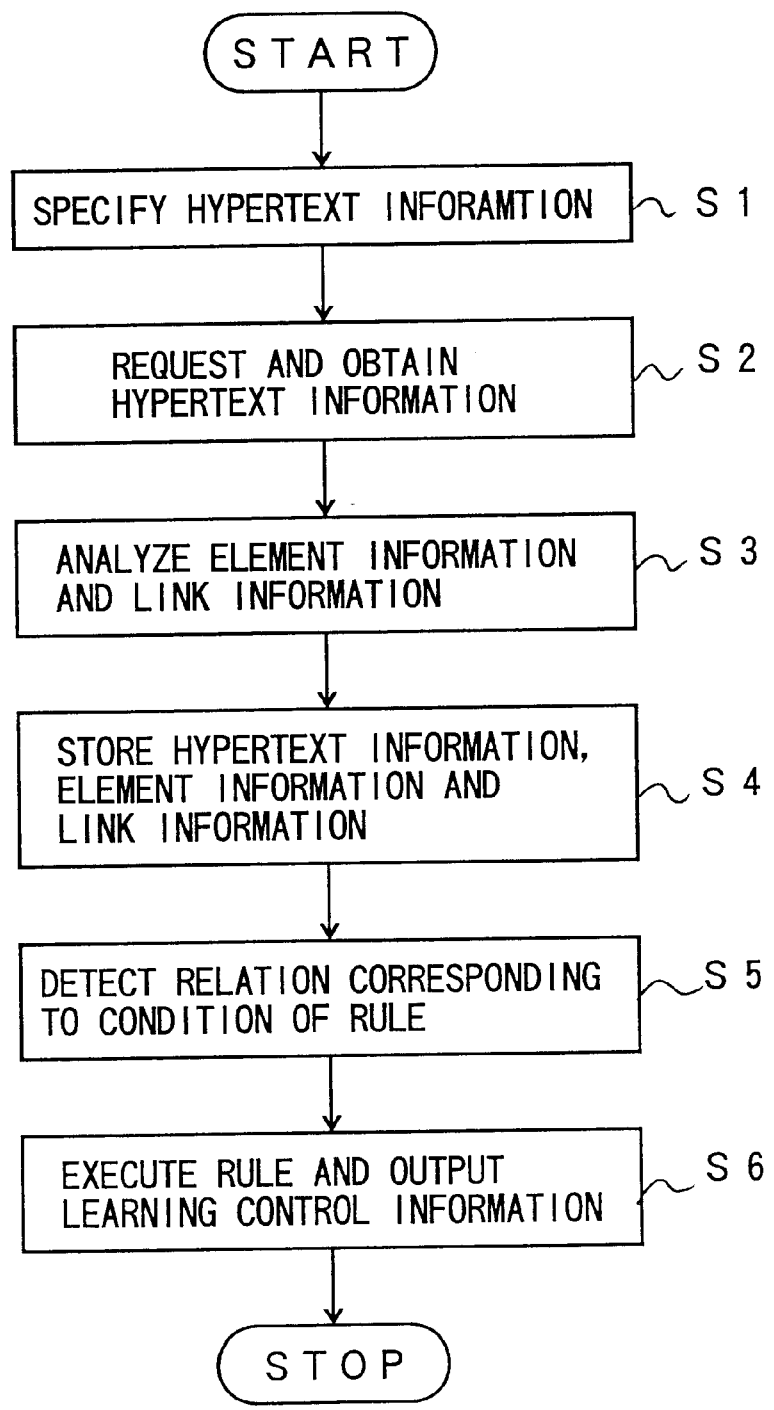
FIG. 10 is a diagram for explaining a principle of the present invention.

FIG. 10 is a diagram for explaining a principle of the present invention. In the following, the principle of the present invention will be described with reference to FIG. 10. The present invention is a method for generating earning control information in an information providing system. In the information providing system, at least an information providing server which is connected to a network maintains hypertext information, receives a request for information specified by URI (universal resource identifier) information, and sends hypertext information specified by the URI information to a source of the request. In the method, a user who generates the learning control information specifies first hypertext information from which a process starts in step 1, the specified hypertext information is requested and obtained in step 2, and, then, the specified hypertext information is analyzed so as to obtain element information and link information included in the hypertext information in step 3. Next, a relation between the hypertext information, the element information and the link information is stored in a storage in step 4, and a relation corresponding to a condition of a rule for converting the hypertext information into learning control information is detected from the relation between the hypertext information, the element information and the link information which is stored in the storage in step 5, the learning control information being necessary for using the information providing system as a learning support system. Then, finally, the rule is executed and the learning control information is output in step 6.

Figure 11:
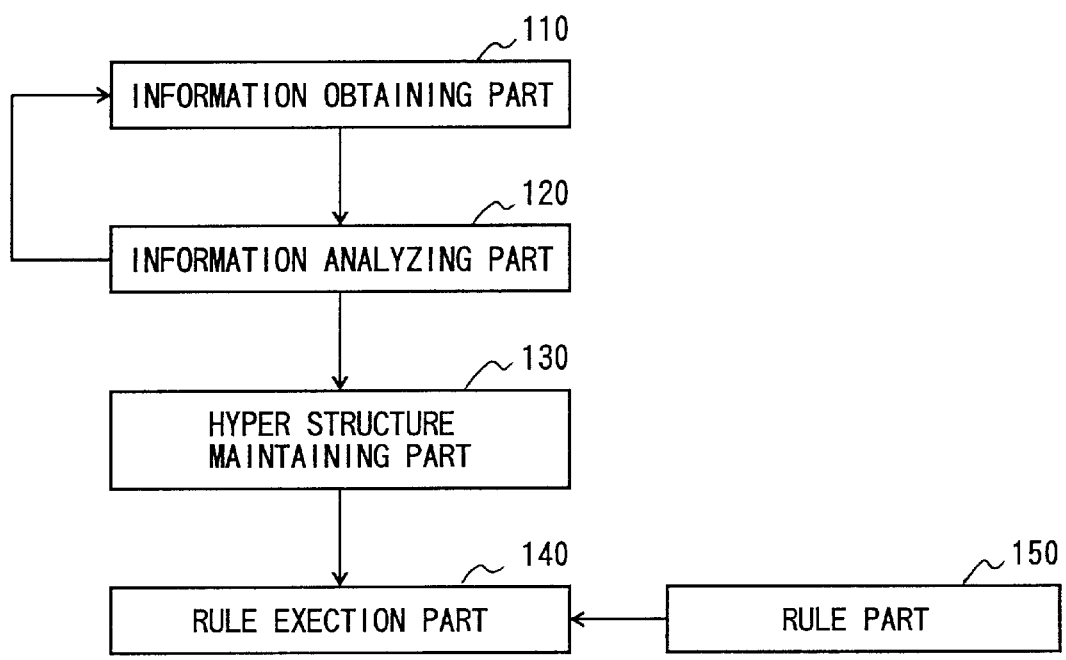
FIG. 11 shows a configuration of a learning control information generation apparatus according to the present invention.

FIG. 11 shows a configuration of a learning control information generation apparatus according to the present invention.

The learning control information generation apparatus includes an information obtaining part 110, an information analyzing part 120, a hyperlink structure maintaining part 130, a rule execution part 140 and a rule part 150.

The information obtaining part 110 obtains information specified by a user and information specified by the information analyzing part 120 from the information providing server via a network, and sends the information to the information analyzing part 120.

The information analyzing part 120 receives the information sent from the information obtaining part 110, analyzes a hyperlink structure in the information, and sends a request to obtain information again to the information obtaining part 110 on the basis of link information included in the information. Then, the information analyzing part 120 sends the analyzed hyperlink structure to the hyperlink structure maintaining part 130.

The hyperlink structure maintaining part 130 maintains all hyperlink information sent from the information analyzing part 120.

The rule part 150 maintains rules for generating the learning control information based on the hyperlink structure.

The rule execution part 140 generates the control information by applying the rule in the rule part 150 to the hyperlink information in the hyperlink structure maintaining part 130.

Figure 12:
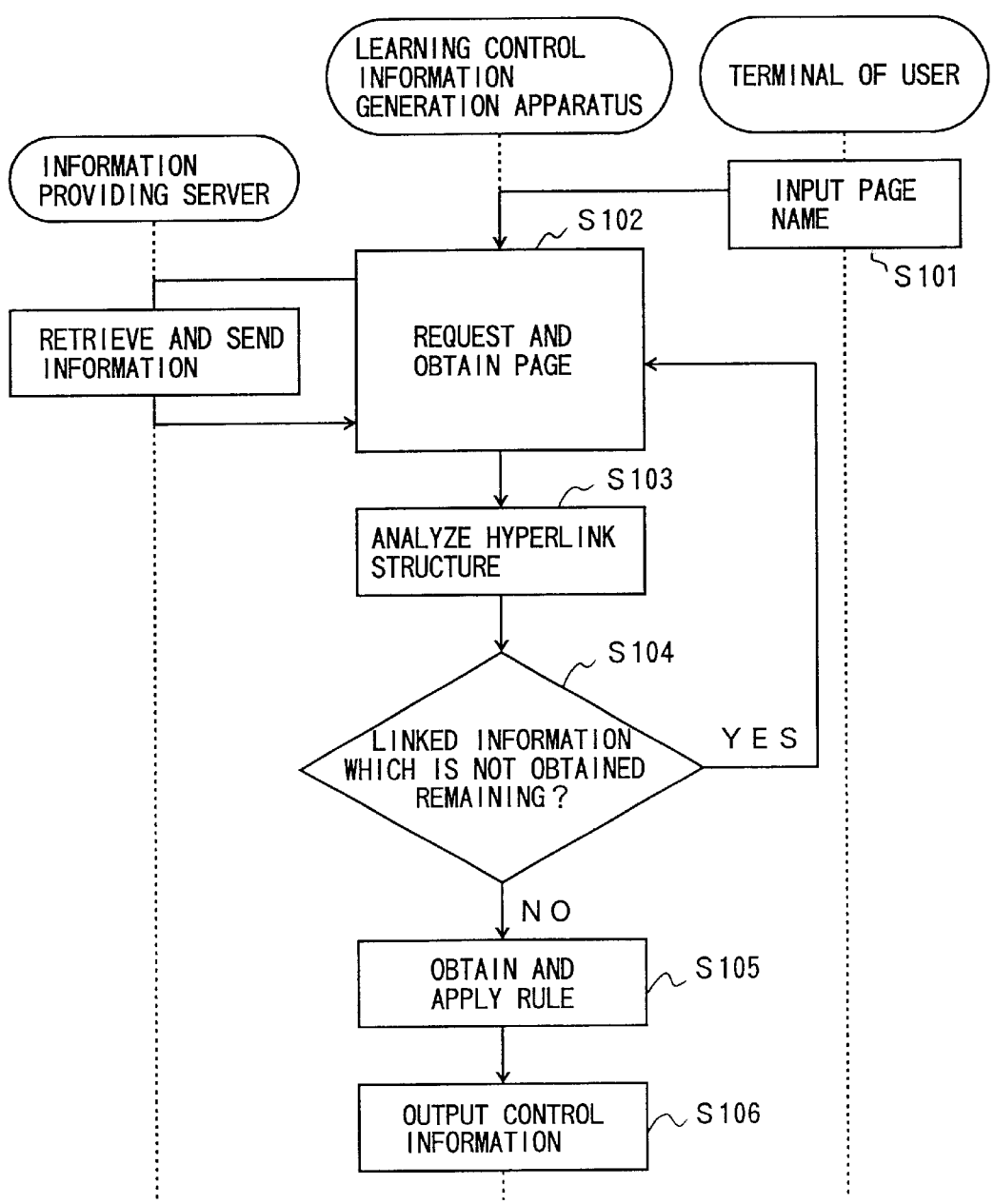
FIG. 12 is a sequence chart showing the operation of the learning control information generation apparatus of the present invention.

In the following, an operation of the above-mentioned apparatus will be described. FIG. 12 is a sequence chart showing the operation of the learning control information generation apparatus of the present invention.

First, the information obtaining part 110 receives a page name from a terminal of the user in step 101. Next, the information obtaining part 110 obtains information specified by the user and information specified by the information analyzing part 120 from the information providing server via the network, and sends the information to the hyperlink structure analyzing part 120 in step 102.

The hyperlink structure analyzing part 120 analyzes a hyperlink structure of the information in step 3 and determines, in step 4, whether there remains any linked information which is not yet obtained. If it remains, the process moves to step 102. If no linked information which is not yet obtained remains, the rule execution part 140 searches the rule part 150, obtains rules which can be applied to the hyperlink structure and applies the rules in step 105. Then, the result of application of the rules is output as the learning control information in step 6.

In the following, embodiments of the present invention will be described in detail with reference to figures.

FIRST EMBODIMENT

Figure 13:
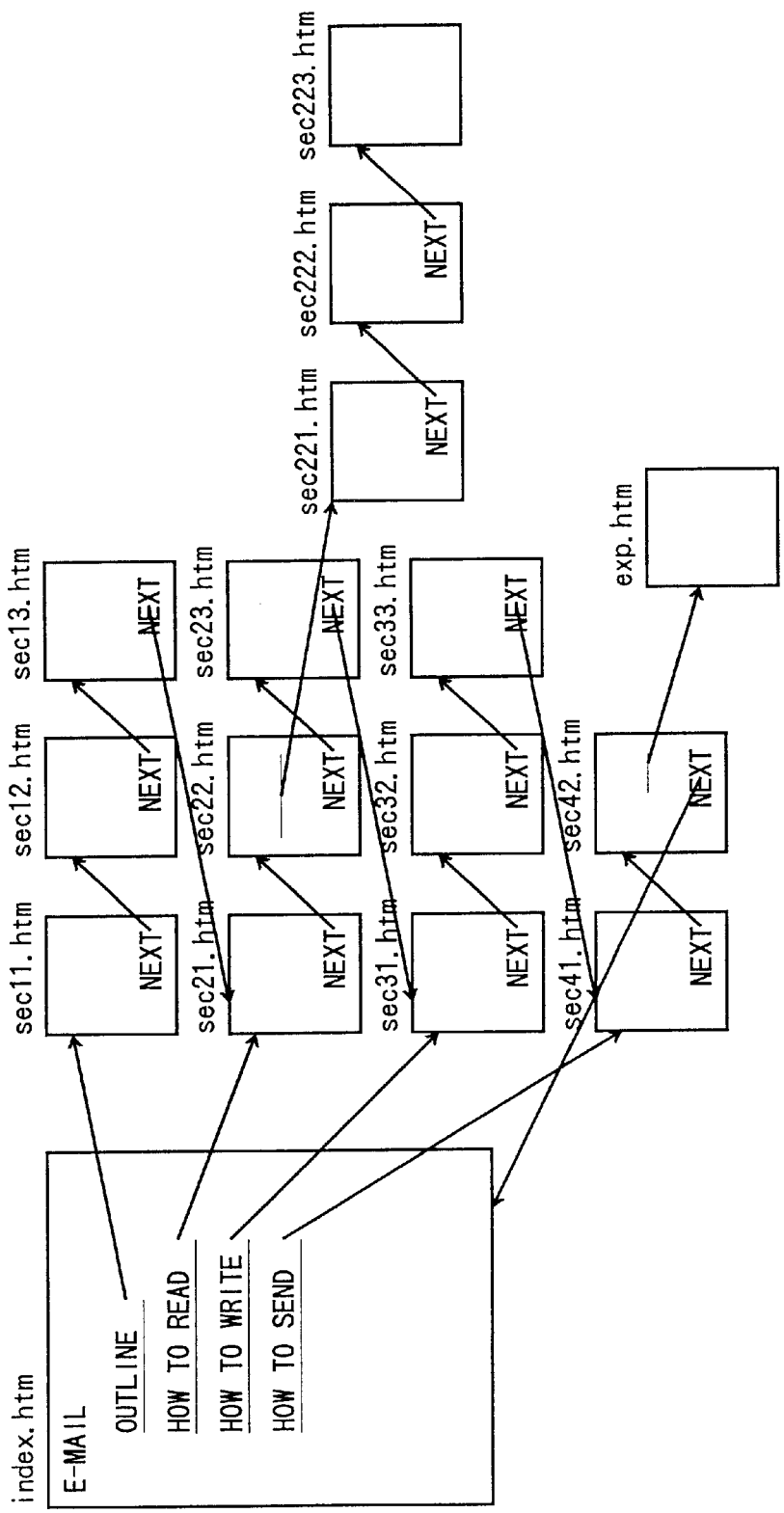
FIG. 13 is an example of a structure of a hypertext page which is an object from which the learning control information is generated according to a first embodiment of the present invention.

FIG. 13 shows an example of a structure of a hypertext page which is an object from which the learning control information is generated according to a first embodiment of the present embodiment. In the figure, an arrow indicates a link which an anchor "next" indicates.

First, the user sets a first page to the system. The information obtaining part 110 obtains a file from the information providing server. Then, the information analyzing part 120 analyzes the obtained file. The information obtaining part 110 and the information analyzing part 120 perform such a process over and over again in which process the information obtaining part 110 obtains a page linked from an original page based on a result of the analysis and the information analyzing part 120 analyzes the obtained page. As for obtaining pages, the information obtaining part 110 may obtain pages only in the same information server as one storing the first page. The process is performed until all hyperlinks are analyzed, or until hyperlinks of a predetermined depth of the hierarchy are analyzed, the depth being predetermined by the user. In the example shown in FIG. 13, a total of 16 pages are obtained.

Figure 14:
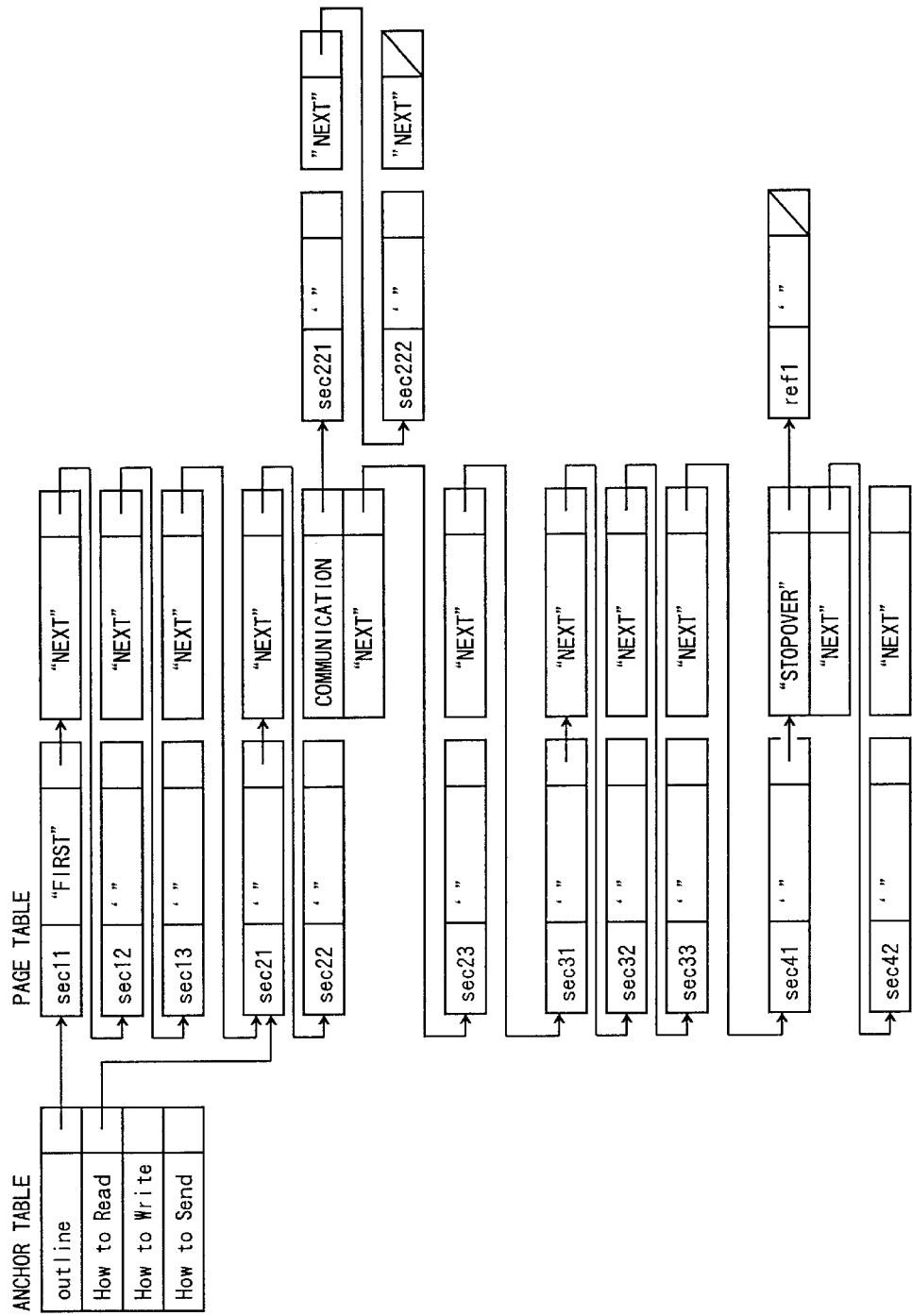
FIG. 14 is an example of a result of analysis of a hyperlink structure according to the first embodiment of the present invention.

When there remains no page to be obtained or when the number of tiers of the link reaches a predetermined number which is counted from the first page, the information analyzing part 120 analyzes a hyperlink structure. A result of the analysis of the hyperlink structure is shown in FIG. 14. A page table shown in FIG. 14 includes a page name, a title name and a pointer to an anchor table in which an anchor included in the page of the page name is described. The anchor table includes an anchor name and a pointer to a linked page. For example, in FIG. 14, a destination of a link indicated by an anchor "outline" is a page "sec11.htm". The page "sec11.htm" has an anchor "next", the destination of which is "sec12.htm".

Here, an anchor table will be called a parent anchor table of a page table when the anchor table specifies the page table as a link destination. That is, in FIG. 14, the parent anchor table of the page table including "sec11.htm" is the anchor table including "outline". In addition, a page table will be called a parent page table of an anchor table when the page table has a link to the anchor table.

Further, page tables which have the same parent anchor table will be called brotherhood page tables. For example, the page table including "sec11.htm" and the page table "sec21.htm" are brotherhood page tables because they have the same parent anchor table which includes "outline". In the brotherhood page tables, a table which is described ahead of another page table in the brotherhood page tables will be called a starting point page table and the other page table will be called an end point page table. For example, of the page table including "sec11.htm" and the page table including "sec21.htm", the page table including "sec11.htm" is the starting point page table and the page table including "sec21.htm" is the end page table. Further, a page table between the starting point page table and the end point page table will be called an intermediate page table.

Figure 15A:
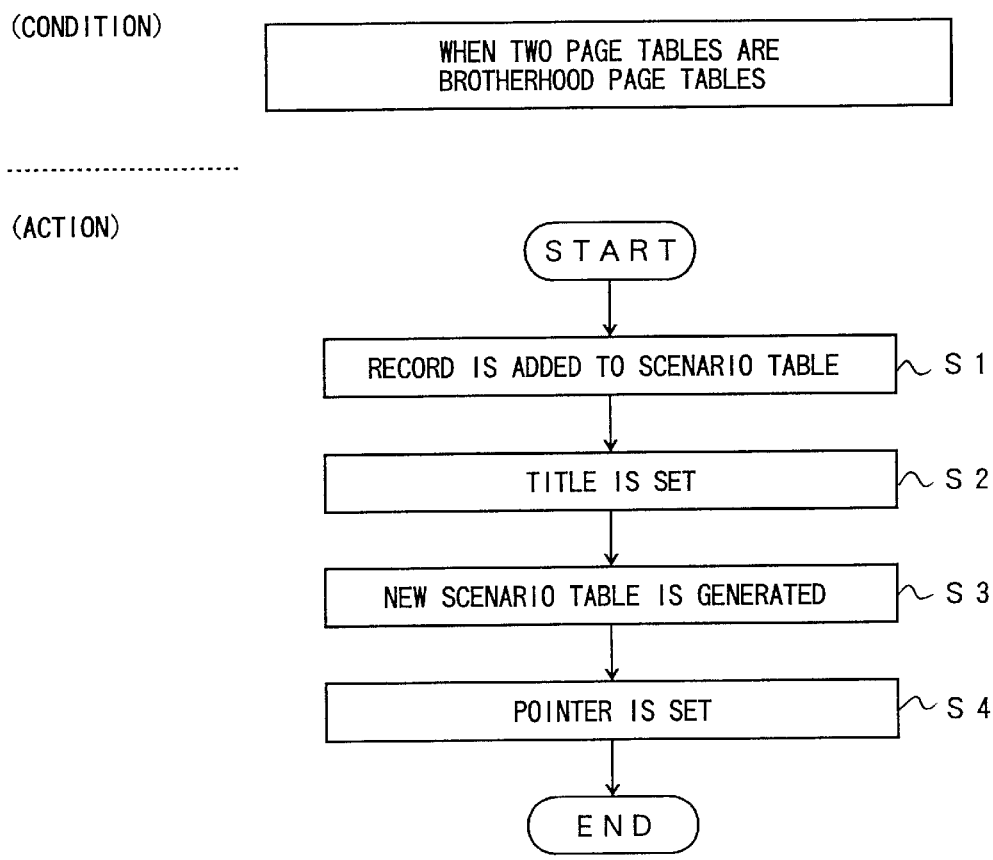
Figure 15C:
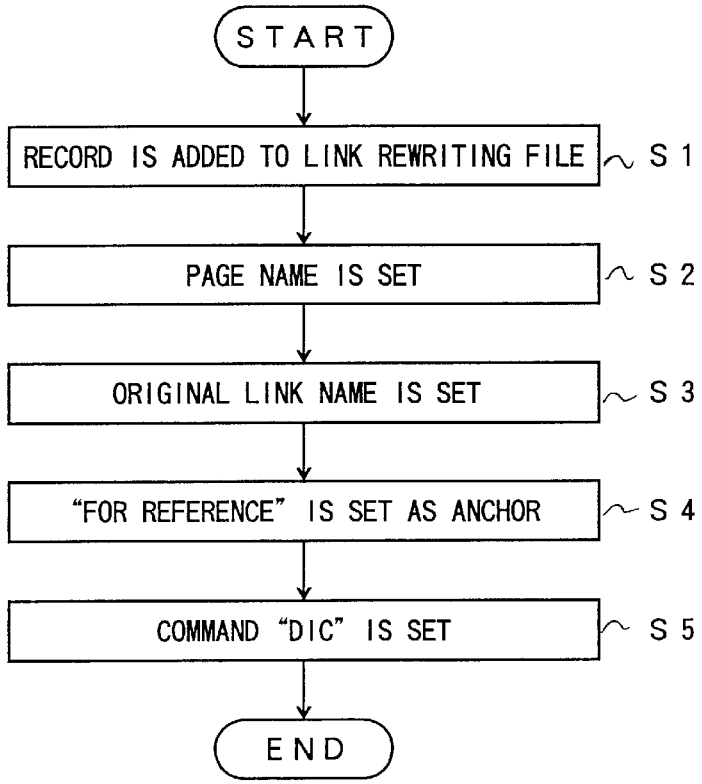
Figure 16:
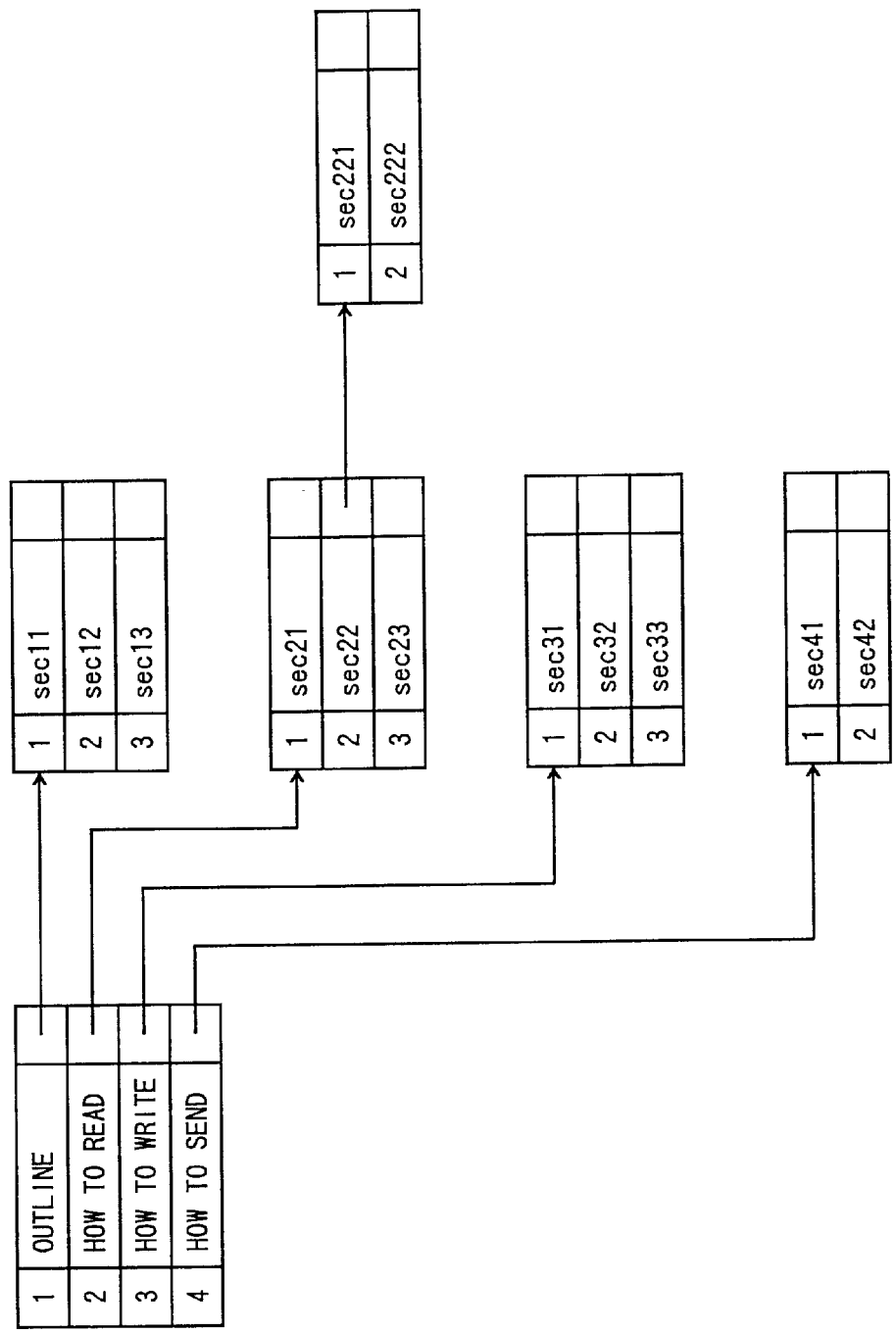
FIG. 16 is a scenario table which is obtained by applying a rule 1 according to the first embodiment of the present invention.

FIGS. 15A–C show an example of a rule 1 and a rule 2 according to the embodiment of the present invention. When a part of a hyperlink structure matches with information described in a condition part of a rule, a process described in an action part of the rule is executed. A scenario table shown in FIG. 16 is obtained by applying the rule 1 to the structure shown in FIG. 14. In addition, a link rewriting file like one shown in FIG. 8 is generated.

The rule 1 shown in FIGS. 15A, B is applied when two page tables linked with an anchor table which includes an anchor name "next", "to next", "go ahead" or the like are the brotherhood page tables. The action of the rule 1 is as follows.

First, in step 1, a scenario table is generated and a record is added. In step 2, a title which is a name of a scenario is set. For example, the title corresponds to "outline" shown in FIG. 16. Then, in step 3, a new scenario table is generated, and the starting point page table and intermediate page tables are set. The intermediate page tables are set until the end point page table is reached. The intermediate page tables correspond to sec11–sec13 shown in FIG. 16. In step 4, a pointer of the scenario table is set to a new scenario table. This corresponds to setting a pointer in a record of "outline" to a scenario table of sec11–sec13 in FIG. 16. The above-mentioned process is performed for all relations to which the rule 1 can be applied.

FIG. 15B shows an action in the rule 1 associated with generation of the link rewriting file. When the condition for executing the rule 1 is satisfied, a process shown in FIG. 15B is also executed as the action.

In step 1, a record is added to a link rewriting file. Next, items of the record are set as follows. In step 2, a page name of the starting point page table is set. In step 3, a page name of an intermediate page table which is linked with the starting point page by a "next" anchor is set as an original link name. In step 4, "next" is set as an anchor, and in step 5, a command "NEXT" is set. FIG. 15B shows the above-mentioned process for one time. As a matter of fact, the above-mentioned process is applied to each intermediate page table and to the end point page table.

Next, a rule 2 shown in FIG. 15C will be described. The rule 2 is a rule used for generating a link rewriting file for "for reference", "for your information" or the like, and is applied when there is a page table which is linked with an anchor table the anchor name of which is "for reference", "for your information" or the like.

In step 1, a record is added to a link rewriting file. Next, items of the record are set as follows. In step 2, a page name of a page table is set. In step 3, a page name of a page table which is linked with above-mentioned page table by a "for reference" or a "for your information" anchor is set as an original link name. In step 4, "for reference" is set as an anchor, and in step 5, a command "DIC" is set.

Here, the meaning of the rule 1 will be described. Pages which are linked by a conjunction can be considered as a chapter or a section, wherein the conjunction represents a continuation such as "next". Thus, a chapter or a section which has such a page name as a title is added to the scenario table, and the pointer is set such that it indicates a page table of a new section or paragraph which is linked by "next". In addition, the anchor "next" can be converted to a NEXT command. Further, according to the rule 2, a page linked by "for reference" or "for your information" can be converted to a DIC command. When the above-mentioned process is completed for every anchor in a first anchor table, the same process is applied to each anchor in a next anchor table such that the scenario table is generated.

As mentioned before, FIG. 16 shows a result of application of the rule to a structure in FIG. 14. As shown in FIG. 14, under a first anchor, there are three pages linked by a "next" link, which satisfies the condition of the rule 1. Therefore, the learning control information generation apparatus determines that a chapter the title of which is "outline" exists. Then, the action part of the rule is executed and each page is added to the scenario table. When the above-mentioned process is completed for every anchor, the same process is applied to another anchor table which has not been processed.

In the above-mentioned method, it is possible to add a process in which the system makes an inquiry to the user whether a page should be added as a teaching material. In addition, it is possible to add a process that the system makes an inquiry to the user whether a rule should be applied.

The above-mentioned rule part 150 may store various rules other than the above-mentioned rules. For example, a rule which includes "back" which is a suffix often used as an anchor of a hypertext on WWW other than "next" can be used. In addition, a rule which includes "return" which suggests a hierarchical structure can be used.

Further, in the above-mentioned embodiment, when there exists a hyperlink structure to which no rule can be applied, it is possible to show processes which can be applied to the hyperlink structure by showing a menu of the processes so as to allow the user to select a process. Thus, a process which is not described in any of the rules can be applied.

SECOND EMBODIMENT

In the above-mentioned first embodiment, automatic generation of a scenario structure and a link rewriting file was described. In the second embodiment, automatic generation of a learning target will be described.

Figure 17:
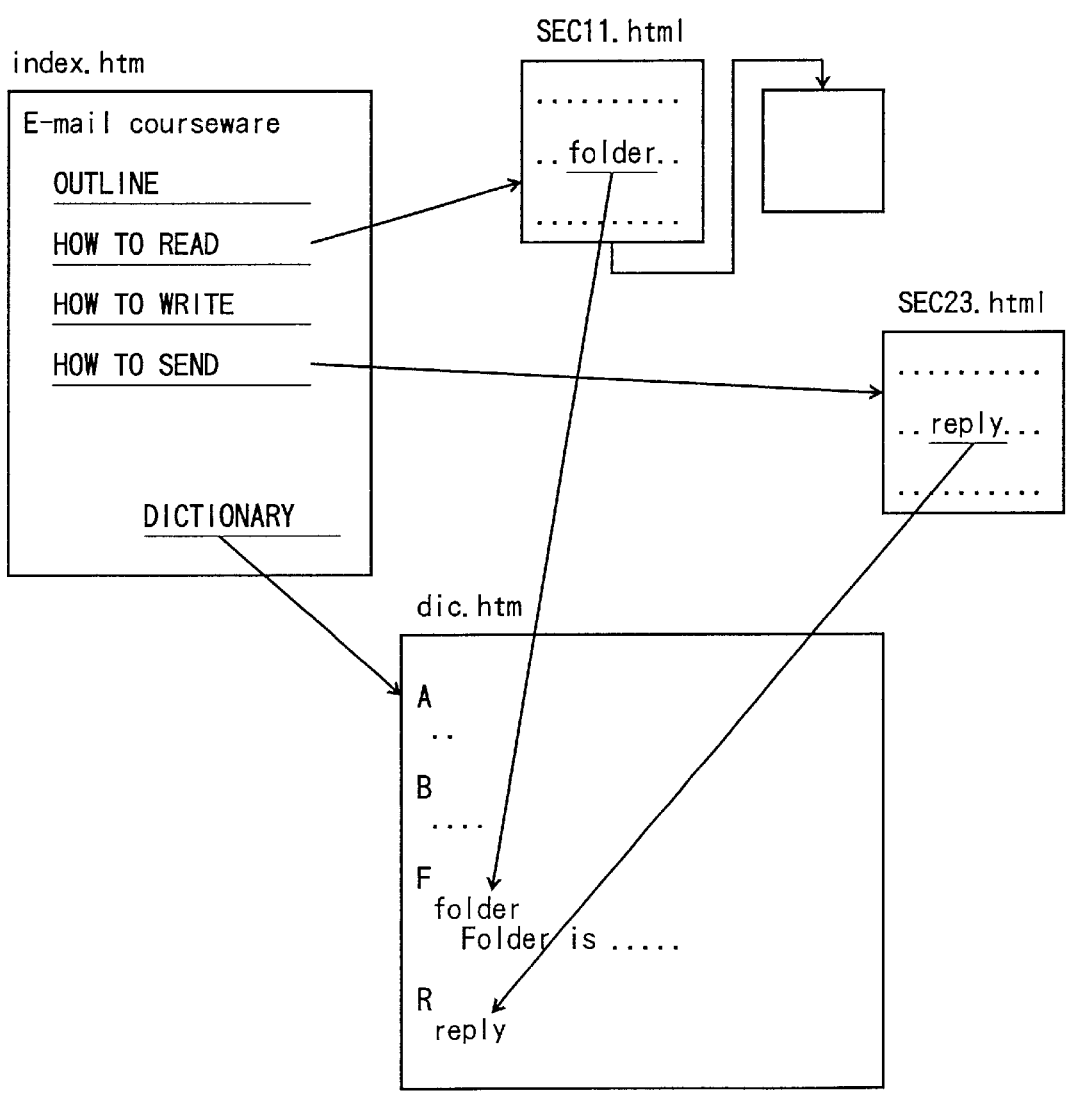
FIG. 17 is an example of a structure of a hypertext page which is an object from which the learning control information is generated according to a second embodiment of the present invention.
Figure 18:
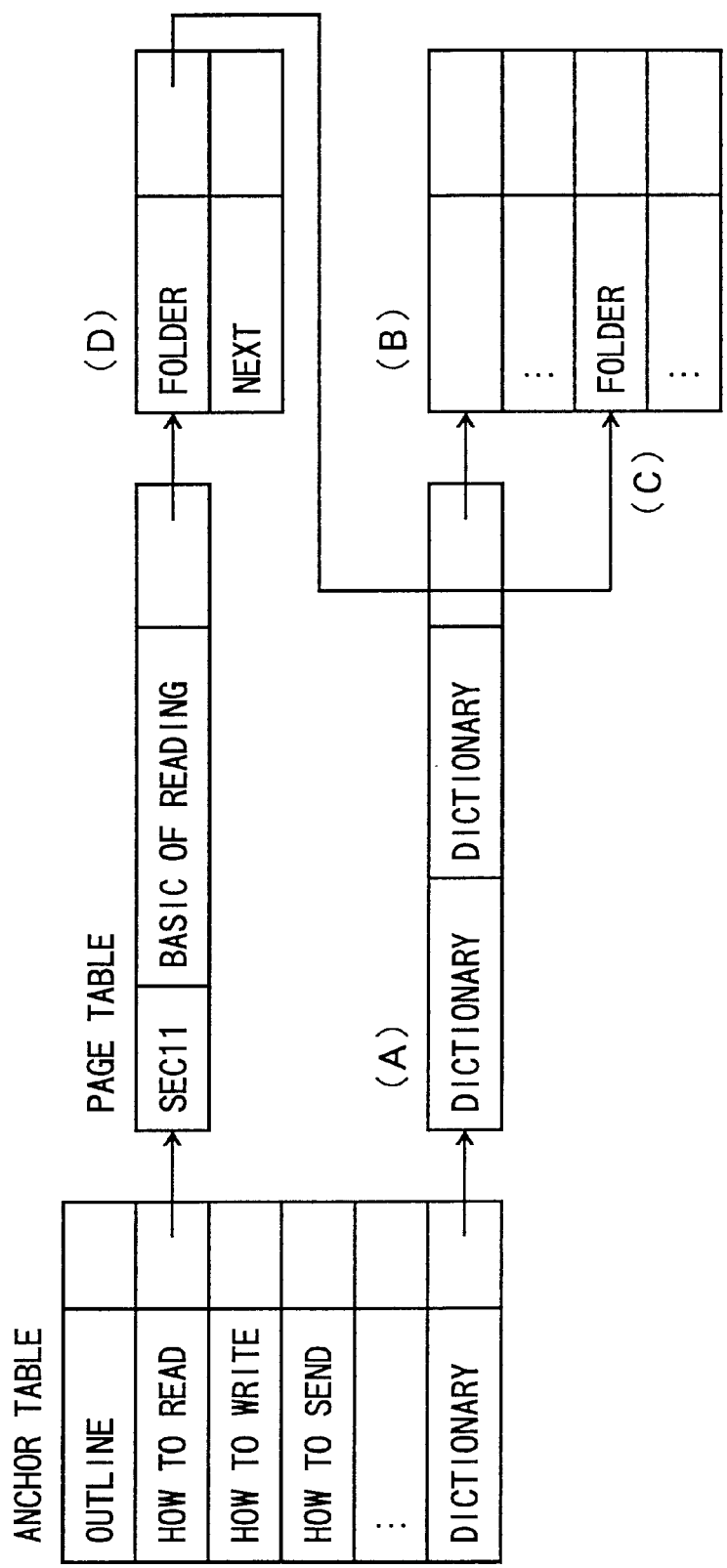
FIG. 18 shows an analyzed structure of the pages shown in FIG. 17.

FIG. 17 shows a hypertext page from which learning control information is generated according to the second embodiment of the present invention. As shown in FIG. 17, the hypertext page has an anchor "dictionary" which indicates a link to a page "dic.htm". The page "dic.htm" functions as a dictionary describing each term in alphabetical order or the Japanese syllabary order. The format of the page often appears as hypertext information on the Internet. In addition, the page "dic.htm" is linked by pages such as sec11.htm which are linked by the page "index.htm". The links to "dic.htm" are set in order to allow a user to look up a term which the user wants to know in detail. For example, as shown in FIG. 17, a link is provided from a term "folder" in "sec11.html" to the dictionary page. FIG. 18 shows an analyzed structure of the pages shown in FIG. 17, in which "sec23.html" is not shown.

FIG. 19 shows rules according to the second embodiment of the present invention. The rules shown in FIG. 19 are rules which are added to the first embodiment described above. A rule 3 and a rule 4 will be described in detail with reference to FIG. 18.

The rule 3 is applied when there is a page table (A) which is linked from an anchor table having a record with an anchor name "dictionary", "appendix" or "library", or when there is a page table (A) with a page name "dictionary", "appendix" or "library". According to the action of the rule 3, every anchor name in an anchor table (B) which is linked from the page table (A) is added to a target definition table shown in FIG. 20, because each concept of each term described in a dictionary or a glossary is considered to be generally a concept which a provider of the material wants the user to learn.

In the following, the rule 4 will be described.

Figure 20:
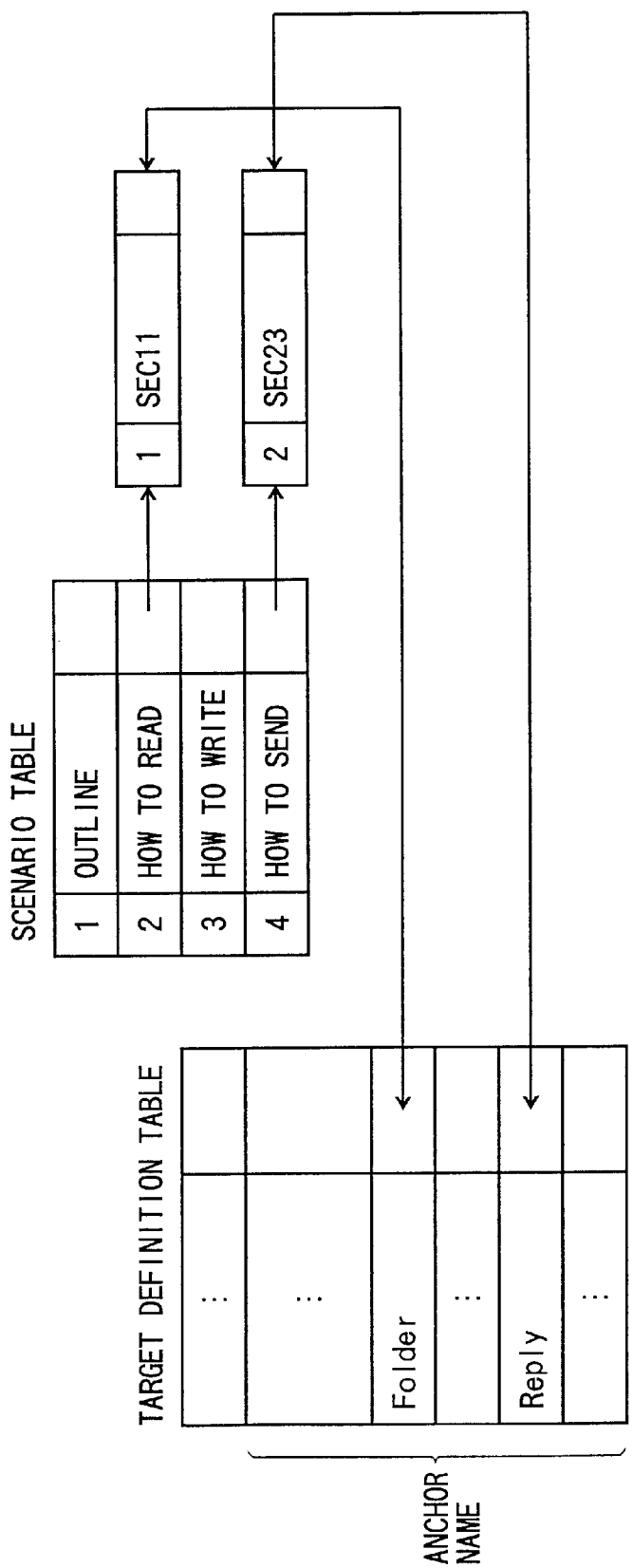
FIG. 20 is a target definition table obtained by applying rules according to the second embodiment of the present invention.

The rule 4 is applied when a record (C) in the anchor table (B) linked from the page table (A) detected by the condition part of the rule 3 is linked by any other anchor table, an anchor table (D) in this case. According to the action of the rule 4, a record of a scenario table in which a page name of a parent page table of the anchor table (D) is linked to a record of the target definition table corresponds to the record (C) of the anchor table (B) as shown in FIG. 20. FIG. 20 shows the target definition table which is obtained by applying the rule 3 and the rule 4 according to the second embodiment of the present invention. As shown in FIG. 20, concepts "folder" and "reply" are linked with "sec11" and "sec23" in the scenario table respectively.

In the above-mentioned method, it is possible to add a process in which the system makes an inquiry whether a file should be added as a teaching material to the user. In addition, it is possible to add a process in which the system makes an inquiry whether a rule should be applied.

Further, in the above-mentioned embodiment, when there exists a hyperlink structure to which no rule can be applied, it is possible to show processes which can be applied to the hyperlink structure by showing a menu of the processes so as to allow the user to select a process. Thus, a process which is not described in any rules can be applied.

The above-mentioned first and second embodiments were described based on the configuration shown in FIG. 11. However, the present invention can be realized by a computer having a program for carrying out the above-mentioned processes.

FIG. 21 is a block diagram showing a hardware configuration of such a computer system. As shown in FIG. 21, the computer system includes a CPU 100 by which a process of a program is executed, a memory 101 for storing data and a program, an external storage unit 102 for storing data and a program used for the memory 101 or the CPU 100, a display 103 for displaying data, a keyboard 104 for inputting data or commands, and a communication processing unit 105 which enables the computer system to communicate with other computers via a network. The program is installed in the memory 101 or the external storage unit 102 and is executed by the CPU 100.

The computer readable medium which stores the program of the present invention corresponds to the memory 101 or the external storage unit 102. In addition, a memory, a hard disk, and transportable medium such as a floppy disk, a CD-ROM, a magnetic tape and the like can be used as a computer readable medium of the present invention. By loading the program stored in the medium of the present invention in a computer system, the computer system can carry out the learning control information generation method of the present invention. In addition, the program can be preinstalled in a computer system.

According to the present invention, since it becomes possible to generate, automatically or semiautomatically, the scenario definition file and the target definition file based on link information and anchor information included in a hypertext page, the cost for generating the definition files can be reduced.

In a hypertext system, there is a possibility that each page in an information server may be changed at irregular intervals by an administrator of the information server. However, according to the present invention, the definition files can be maintained appropriately for the learning support system by carrying out the method of the present invention periodically or when a user begins to learn.

The present invention is not limited to the specifically disclosed embodiments, and variations and modifications may be made without departing from the scope of the invention.

What is claimed is:

1. A learning control information generation apparatus in a web-based training system which uses the WWW for education, said learning control information generation apparatus comprising:

information obtaining means for requesting and obtaining hypertext information specified by an URI;

means for analyzing said hypertext information, obtaining element information and link information, and instructing said information obtaining means to request and obtain information specified by said link information;

means for storing relationships between said hypertext information, said element information and said link information as a list structure;

rule storing means for storing at least a rule for converting said relationships between said hypertext information, said element information and said link information into learning control information suitable for use in said web-based training system; and rule executing means for detecting a relationship which corresponds with a condition of said rule from said relations between said hypertext information, said element information and said link information, executing an action of said rule corresponding to the detected relationship and outputting said learning control information.

2. The learning control information generation apparatus as claimed in claim 1, said rule executing means comprising:

means for asking a user whether said rule needs to be executed after said relationship is detected, and executing said action of said rule only when said user accepts.

3. The learning control information generation apparatus as claimed in claim 1, said rule executing means comprising:

means for asking a user to select what process needs to be applied to a hyperlink structure to which said rule can not be applied, and executing said process which said user selects.

4. A learning control information generation apparatus in a web-based training system which uses the WWW for education, said learning control information generation apparatus comprising:

means for receiving a first page specified by a user;

means for obtaining a file corresponding to said first page;

analyzing means for analyzing contents of said file, obtaining a page linked from a page in said file one after another and analyzing every hyperlink structure;

means for storing a result obtained by said analyzing means, said result forming a list structure comprising a page table having information including a file name of each page, an anchor included in each page and an anchor table having a pointer to a page table corresponding to a linked page; and means for applying at least a rule to said result and generating learning control information necessary for said web-based training system, said rule being for generating a scenario table, a link rewriting table and a target definition table which are said learning control information.

5. The learning control information generation apparatus as claimed in claim 1, said rule storing means storing:

a condition part for determining whether said rule is applied; and an action part which is executed when said condition is satisfied.

6. The learning control information generation apparatus as claimed in claim 4, said rule storing means storing:

a condition part for determining whether said rule is applied; and an action part which is executed when said condition is satisfied.

7. The learning control information generation apparatus as claimed in claim 5, said action part comprising:

means for setting a title in a first scenario table;

means for generating a second scenario table;

means for setting a starting point page table and at least an intermediate page table in said second scenario table; and means for setting a pointer to said second scenario table in said first scenario table.

8. The learning control information generation apparatus as claimed in claim 7, said condition part being satisfied when at least two page tables of a plurality of page tables which are connected by a conjunction which represents a continuation have the same parent anchor table.

9. The learning control information generation apparatus as claimed in claim 5, said rule storing means storing a rule including said condition part and said action part;

said condition part being satisfied when at least two page tables of a plurality of page tables which are connected by a conjunction which represents a continuation have the same parent anchor table; and said action part comprising:

means for adding a record in a link rewriting file;

means for setting a page name of a starting point page table;

means for setting a page name of an intermediate page table as an original link name;

means for setting said conjunction as an anchor; and means for setting a command corresponding to said conjunction.

10. The learning control information generation apparatus as claimed in claim 5, according to said rule, said learning control information generation apparatus further comprising:

means for setting, when a dictionary page exists, all terms of said dictionary page in a target definition table; and means for linking, when a page having a link to a term of said dictionary page exists in a scenario table, a record corresponding to said page in said scenario table and a record corresponding to said term in said target definition table.

11. A computer readable medium storing program code for causing a computer to generate learning control information in a web-based training system which uses the WWW for education, said computer readable medium comprising:

information obtaining program code means for requesting and obtaining hypertext information specified by an URI;

program code means for analyzing said hypertext information, obtaining element information and link information, and instructing said information obtaining program code means to request and obtain information specified by said link information;

program code means for storing relationships between said hypertext information, said element information and said link information as a list structure;

rule storing program code means for storing at least a rule for converting said relationships between said hypertext information, said element information and said link information into learning control information necessary for said web-based training system; and rule executing program code means for detecting a relationship which corresponds with a condition of said rule from said relations between said hypertext information, said element information and said link information, executing an action of said rule corresponding to the detected relationship and outputting said learning control information.

12. The computer readable medium as claimed in claim 11, said rule executing program code means comprising:

program code means for asking a user whether said rule needs to be executed after said relationship is detected, and executing said action of said rule only when said user accepts.

13. The computer readable medium as claimed in claim 11, said rule executing program code means comprising:

program code means for asking a user to select what process needs to be applied to a hyperlink structure to which said rule can not be applied, and executing said process which said user selects.

14. A computer readable medium storing program code for causing a computer to generate learning control information in a web-based training system which uses the WWW for education, said computer readable medium comprising:

program code means for receiving a first page specified by a user;

program code means for obtaining a file corresponding to said first page;

analyzing program code means for analyzing contents of said file, obtaining a page linked from a page in said file one after another and analyzing every hyperlink structure;

program code means for storing a result obtained by said analyzing program code means, said result forming a list structure comprising a page table having information including a file name of each page, an anchor included in each page and an anchor table having a pointer to a page table corresponding to a linked page; and program code means for applying at least a rule to said result and generating learning control information necessary for said web-based training system, said rule being for generating a scenario table, a link rewriting table and a target definition table which are said learning control information.

15. The computer readable medium as claimed in claim 11, said rule storing program code means storing:

a condition part for determining whether said rule is applied; and an action part which is executed when said condition is satisfied.

16. The computer readable medium as claimed in claim 14, said rule storing program code means storing:

a condition part for determining whether said rule is applied; and an action part which is executed when said condition is satisfied.

17. The computer readable medium as claimed in claim 15, said action part comprising:

program code means for setting a title in a first scenario table;

program code means for generating a second scenario table;

program code means for setting a starting point page table and at least an intermediate page table in said second scenario table; and program code means for setting a pointer to said second scenario table in said first scenario table.

18. The computer readable medium as claimed in claim 17, said condition part being satisfied when at least two page tables of a plurality of page tables which are connected by a conjunction which represents a continuation have the same parent anchor table.

19. The computer readable medium as claimed in claim 15, said rule storing program code means storing a rule including said condition part and said action part;

said condition part being satisfied when at least two page tables of a plurality of page tables which are connected by a conjunction which represents a continuation have the same parent anchor table; and said action part comprising:
program code means for adding a record in a link rewriting file;
program code means for setting a page name of a starting point page table;
program code means for setting a page name of an intermediate page table as an original link name;
program code means for setting said conjunction as an anchor; and
program code means for setting a command corresponding to said conjunction.

20. The computer readable medium as claimed in claim 15, according to said rule, said rule executing program code means comprising:

program code means for setting, when a dictionary page exists, all terms of said dictionary page in a target definition table; and program code means for linking, when a page having a link to a term of said dictionary page exists in a scenario table, a record corresponding to said page in said scenario table and a record corresponding to said term in said target definition table.

* * * * *